United States Patent
Kobayashi

(10) Patent No.: US 7,965,904 B2
(45) Date of Patent: Jun. 21, 2011

(54) POSITION AND ORIENTATION MEASURING APPARATUS AND POSITION AND ORIENTATION MEASURING METHOD, MIXED-REALITY SYSTEM, AND COMPUTER PROGRAM

(75) Inventor: Kazuhiko Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 11/830,654

(22) Filed: Jul. 30, 2007

(65) Prior Publication Data

US 2008/0031490 A1    Feb. 7, 2008

(30) Foreign Application Priority Data

Aug. 7, 2006    (JP) ................. 2006-214883

(51) Int. Cl.
*G06K 9/36* (2006.01)
*G06K 9/00* (2006.01)
*G09G 5/00* (2006.01)

(52) U.S. Cl. ........ 382/292; 382/103; 382/154; 382/291; 345/633

(58) Field of Classification Search .................. 382/103, 382/154, 291–292; 345/633
See application file for complete search history.

(56) References Cited

U.S. PATENT DOCUMENTS

| | | | | |
|---|---|---|---|---|
| 5,321,770 A * | 6/1994 | Huttenlocher et al. | ....... | 382/174 |
| 5,525,883 A * | 6/1996 | Avitzour | ....................... | 318/587 |
| 5,642,442 A * | 6/1997 | Morton et al. | ................ | 382/287 |
| 5,687,253 A * | 11/1997 | Huttenlocher et al. | ....... | 382/177 |
| 5,720,021 A * | 2/1998 | Murata et al. | ................. | 345/581 |
| 6,064,749 A * | 5/2000 | Hirota et al. | .................. | 382/103 |
| 6,084,985 A * | 7/2000 | Dolfing et al. | ................ | 382/187 |
| 6,094,215 A * | 7/2000 | Sundahl et al. | ................. | 348/42 |
| 6,504,571 B1 * | 1/2003 | Narayanaswami et al. | ......................... | 348/231.99 |
| 6,577,249 B1 * | 6/2003 | Akatsuka et al. | ............. | 340/988 |
| 6,636,199 B2 | 10/2003 | Kobayashi | | |
| 6,862,019 B2 | 3/2005 | Kobayashi et al. | | |
| 6,993,450 B2 * | 1/2006 | Takemoto et al. | ............ | 702/153 |

(Continued)

FOREIGN PATENT DOCUMENTS

JP    1161589    6/1989

(Continued)

OTHER PUBLICATIONS

C. Harris and M. Stephens, "A Combined Corner and Edge Detector," Proceedings of the 4th Alvey Vision Conference, pp. 147-151 (1988).

(Continued)

*Primary Examiner* — Bhavesh M Mehta
*Assistant Examiner* — Gandhi Thirugnanam
(74) *Attorney, Agent, or Firm* — Fitzpatrick,Cella, Harper & Scinto

(57) ABSTRACT

A position and orientation measuring apparatus comprising, a storage unit adapted to store character region specifying information and position information in association with a character region place in a physical space, a detection unit adapted to detect the character region from first captured image data obtained by capturing an image of the physical space by an image sensing apparatus, using the character region specifying information stored in the storage unit, and an estimation unit adapted to estimate a position and orientation of the image sensing apparatus upon capturing the captured image data based on image position information of the character region, detected by the detection unit, in the first captured image data, and the position information which is stored in the storage unit and corresponds to the detected region.

7 Claims, 11 Drawing Sheets

U.S. PATENT DOCUMENTS

| | | | |
|---|---|---|---|
| 7,075,524 B2* | 7/2006 | Kobayashi et al. | 345/173 |
| 7,630,555 B2* | 12/2009 | Satoh et al. | 382/201 |
| 2002/0057280 A1* | 5/2002 | Anabuki et al. | 345/633 |
| 2002/0069013 A1* | 6/2002 | Navab et al. | 701/200 |
| 2003/0137524 A1* | 7/2003 | Anabuki et al. | 345/633 |
| 2004/0046779 A1* | 3/2004 | Asano et al. | 345/716 |
| 2004/0071315 A1* | 4/2004 | Neely | 382/103 |
| 2004/0104935 A1* | 6/2004 | Williamson et al. | 345/757 |
| 2005/0021281 A1* | 1/2005 | Friedrich et al. | 702/150 |
| 2005/0069172 A1* | 3/2005 | Uchiyama | 382/100 |
| 2005/0179617 A1* | 8/2005 | Matsui et al. | 345/7 |
| 2005/0234333 A1* | 10/2005 | Takemoto et al. | 600/426 |
| 2005/0253870 A1* | 11/2005 | Kotake et al. | 345/633 |
| 2005/0253871 A1* | 11/2005 | Anabuki et al. | 345/633 |
| 2005/0256395 A1* | 11/2005 | Anabuki et al. | 600/414 |
| 2006/0071946 A1* | 4/2006 | Anabuki et al. | 345/633 |
| 2006/0075442 A1* | 4/2006 | Meadow | 725/91 |
| 2006/0202973 A1* | 9/2006 | Kobayashi et al. | 345/173 |
| 2006/0232792 A1 | 10/2006 | Kobayashi | |

FOREIGN PATENT DOCUMENTS

| | | |
|---|---|---|
| JP | 2643960 B2 | 8/1997 |
| JP | 2003-222509 A | 8/2003 |

OTHER PUBLICATIONS

M. A. Fischler, R. C. Bolles, "Random Sample Consensus: A Paradigm for Model Fitting with Applications to Image Analysis and Automated Cartography", Communication of the ACM, vol. 24, pp. 381-395 (1981).

* cited by examiner

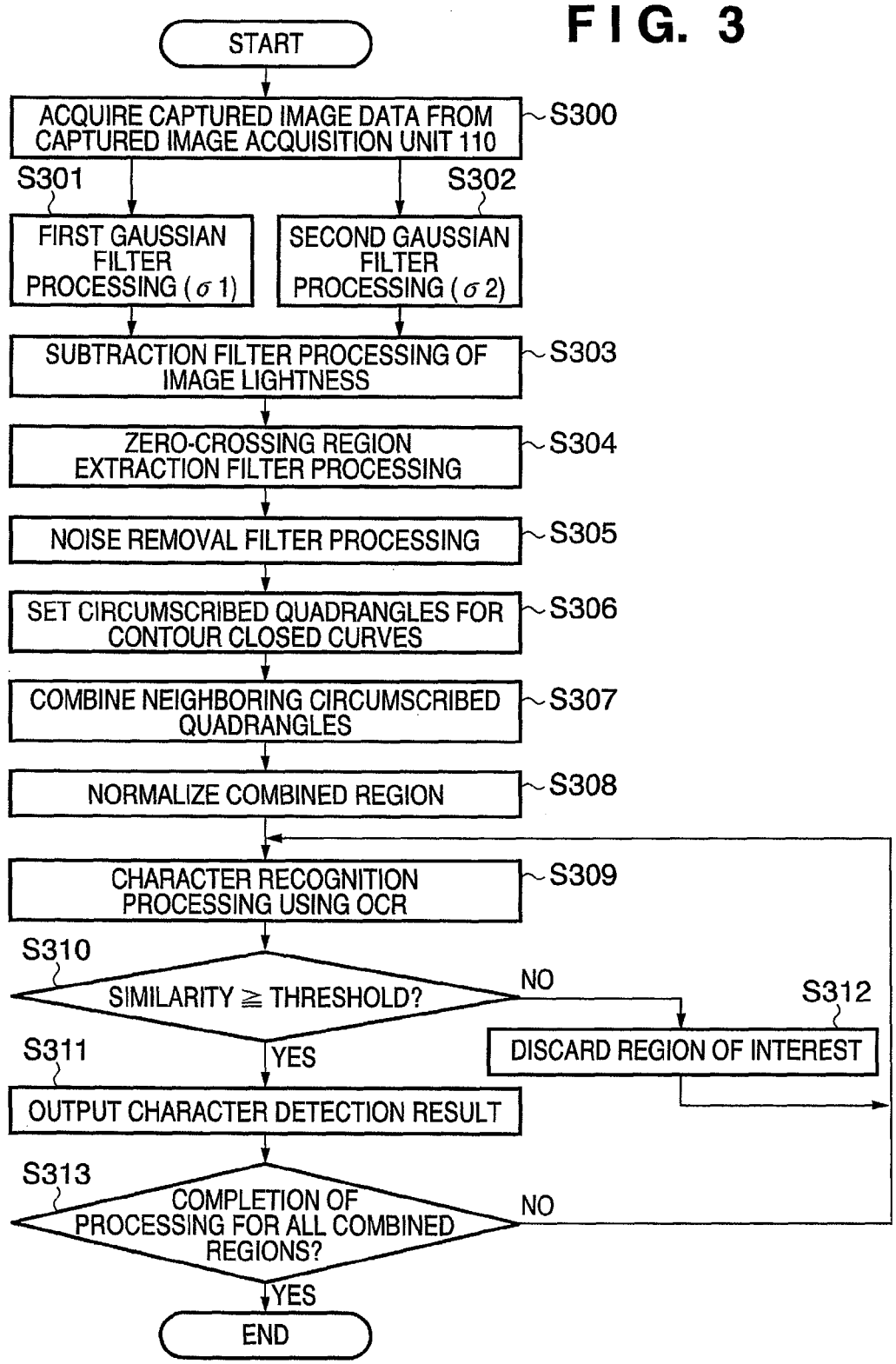

POSITION AND ORIENTATION MEASURING APPARATUS AND POSITION AND ORIENTATION MEASURING METHOD, MIXED-REALITY SYSTEM, AND COMPUTER PROGRAM

BACKGROUND OF THE INVENTION

1. Field of the Invention

The present invention relates to a position and orientation measuring apparatus and position and orientation measuring method, a mixed-reality system, and a computer program.

2. Description of the Related Art

The position and orientation measurement of an image sensing unit such as a camera (to be simply referred to as a "camera" hereinafter as needed) used to capture an image of a physical space is required in a mixed-reality (MR) system that merges and displays the physical space and a virtual space.

As a method of measuring the position and orientation of the camera on the physical space, a method of capturing, using the camera, an image of a plurality of indices whose three-dimensional (3D) positions are known, and calculating the position and orientation of the image sensing unit from the positions of projected points in the captured image has been proposed (see U.S. Pat. No. 6,993,450).

In order to detect the indices from the captured image by image processing, features obtained from a background and other object images, and those of the indices must be separated. For this purpose, since indices having significantly different colors are used in practice, a frame projection region of the indices can be detected from the captured image.

In order to allow measurement of the position and orientation of the camera over a broad range, a plurality of indices must be set on the physical space to which the camera faces. However, it is difficult to set a large number of indices in urban and communal facilities. Furthermore, the extraction method of the indices based on their colors and saturations is susceptible to environmental illuminations, and is hard to use outdoors.

A method of detecting geometric features included in the captured image of the physical space, and measuring the position and orientation of a camera using a large number of detection results has been proposed in the field of computer vision. As a typical geometric feature detection method, the Harris operator is known. The Harris operator detects the positions of edge components which form a corner in an image (see C. Harris and M. Stephens. "A combined corner and edge detector," Proceedings of the 4th Alvey Vision Conference, pp. 147-151, 1988). Also, a method of trying hypotheses with a plurality of corresponding candidates based on the detected geometric features, and adopting a hypothesis with the fewest errors (RANSAC) has also been proposed (see M. A. Fischler, R. C. Bolles. "Random Sample Consensus: A Paradigm for Model Fitting with Applications to Image Analysis and Automated Cartography," Communication of the ACM. Vol. 24, pp. 381-395, 1981).

On the other hand, assuming the use in urban areas, communal facilities and the like, there are many posters such as signs indicating the destinations and current location, advertisements of merchandise, and the like. Characters normally appear on these posters. Also, the layout, dolor scheme, size, and the like of characters are appropriately set to attract public attention.

It is easy for a person to detect a character region from the background. However, preliminary learning is required for a machine to recognize if an object is a character. For this purpose, a character recognition technique has been proposed (see Japanese Patent No. 02643960), and it is a technique industrially prevalent enough to be sustainable in recognition of printed characters. Also, detection of a character region from an image can be implemented by additionally using an OCR technique.

Many methods for detecting a character region from the captured image of the camera, and exploiting character information in navigation and the like have been examined. This method aims at reading a character string. If there is only one character string, it is assumed that the camera exists in the vicinity of a poster since it can capture the image of the poster. This method does not consider the acquisition of the position and orientation of the camera. However, an image sensing frame includes a plurality of posters unless a single poster is captured as a closeup in the image sensing frame of the camera. Therefore, in order to accurately obtain the relationship with other posted contents or character strings, the position and orientation of the camera must be acquired.

In consideration of an application to navigation in premise movement or the like, it is a common practice to point to the next direction to go, and information associated with the position and orientation of the camera is indispensable in accurate navigation. Furthermore, since GPS service is not available underground or inside buildings, it is difficult to directly apply the car navigation mechanism to the position and orientation estimation of a camera which is carried around by a person for premise movement over a broad range underground or inside buildings.

Note that the position and orientation estimation of a camera using its captured image is superior in terms of cost owing to the versatility of the camera as an input apparatus. Meanwhile, in order to allow movement over a broad range and to implement the position and orientation measurement using the captured image, indices whose 3D coordinate positions are known must be captured. However, in an area that requires prior approval about settings such as urban areas, communal facilities and the like, it is difficult to set a large number of such indices. Therefore, in consideration of use over a broad range without limiting the range of use, only features which already exist in the area can be used.

From the aforementioned perspective, methods of detecting geometric features of a structure using image processing, and using regions around the detected features as indices have already been proposed. These methods often use the aforementioned Harris corner detection.

However, with the detection method which reacts to unspecified many regions included in an image like the corner detection method, many feature points are detected from structures with periodicity on the outer walls of buildings in a place with many buildings. Since it is difficult to make correspondence between the many detected feature points and registered features, a method of selecting a better result by trying many hypotheses is adopted.

Furthermore, with the above detection method, since the shapes of edges of an object to be detected largely change depending on the image sensing position of the camera, a plurality of features to be detected must be registered depending on the orientations. For this reason, this method is effective only in a state in which the landscape is outdoors and far away.

On the other hand, if the physical space includes features that can be used as indices and can be significantly detected by image processing, the position and orientation measurement of the camera in a place where indices cannot be set in advance or over a broad range with movement can be attained by preferentially exploiting such features.

In an area where people come and go, there are many objects and planes described with characters. For example, there are advertising characters in towns and posters indicating exit directions in communal facilities such as stations and the like. Furthermore, even in facilities such as companies, schools, and the like, there are many posters using characters.

However, a method for obtaining the position and orientation of a camera over a broad range using characters already present on the physical space has not been proposed yet.

SUMMARY OF THE INVENTION

It is, therefore, an object of the present invention to provide a position and orientation measuring technique that can acquire the position and orientation of a camera over a broad range by exploiting characters which already exist on the physical space, and a mixed-reality system that exploits the position and orientation measuring technique.

The present invention according to one aspect of embodiments is directed to a position and orientation measuring apparatus comprising, a storage unit adapted to store character region specifying information and position information in association with a character region placed in a physical space, a detection unit adapted to detect the character region from first captured image data obtained by capturing an image of the physical space by an image sensing apparatus, using the character region specifying information stored in the storage unit, and an estimation unit adapted to estimate a position and orientation of the image sensing apparatus upon capturing the captured image data based on image position information of the character region, detected by the detection unit, in the first captured image data, and the position information which is stored in the storage unit and corresponds to the detected region.

The present invention according to another aspect of embodiments is directed to a mixed-realty system comprising, an image sensing apparatus, the position and orientation measuring apparatus, a virtual object composition unit adapted to generate composite image data by combining a virtual object and captured image data obtained by capturing an image of a physical space by the image sensing apparatus, based on the captured image data and an orientation and position of the image sensing apparatus estimated based on the captured image data, and a display unit adapted to display the composite image data.

Further features of the present invention will become apparent from the following description of exemplary embodiments (with reference to the attached drawings).

BRIEF DESCRIPTION OF THE DRAWINGS

FIG. 3 is a flowchart showing an example of character detection processing;

DESCRIPTION OF THE EMBODIMENTS

First Embodiment

Embodiments will be described in detail hereinafter with reference to the accompanying drawings.

Figure 1:
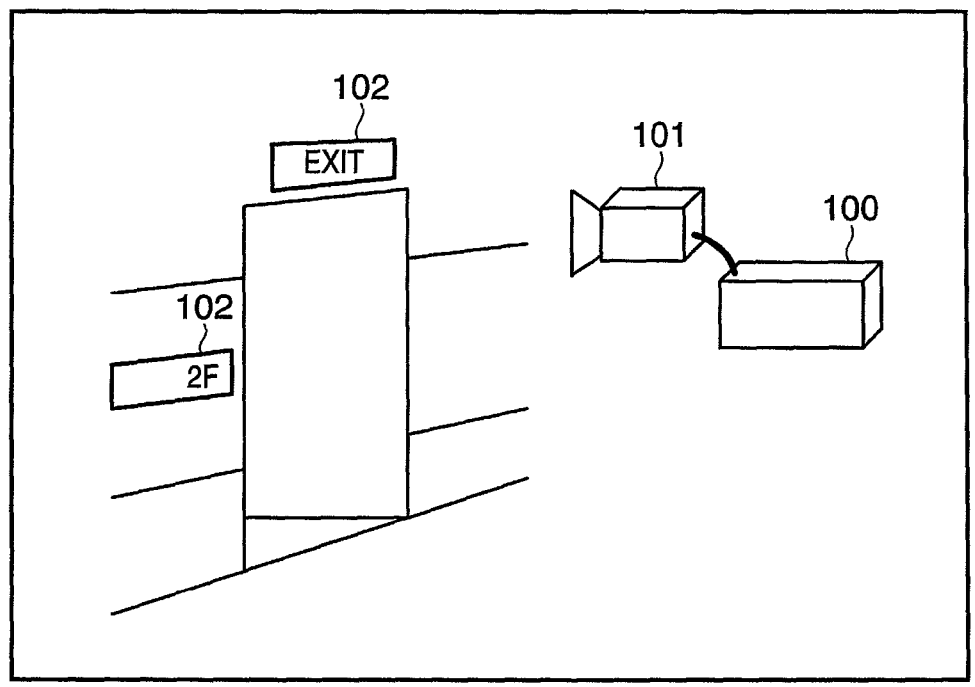
FIG. 1 is a view showing an example when a position and orientation measuring apparatus 100 is applied to an image sensing apparatus 101.

FIG. 1 illustrates an example when a position and orientation measuring apparatus 100 according to an embodiment is applied to an image sensing apparatus 101.

Referring to FIG. 1, an image sensing apparatus 101 comprises an image sensing apparatus of two-dimensional (2D) images using a photoelectric conversion (image sensing) element such as a CCD, CMOS, or the like. The image sensing apparatus 101 can be implemented by, for example, a digital video camera or the like. A video signal generated by image capture of the image sensing apparatus 101 is transferred to the position and orientation measuring apparatus 100 via a wired or wireless communication. Note that the type or transfer method of a signal line is not particularly limited. The image sensing apparatus 101 and the position and orientation measuring apparatus 100 may be fixed to an identical apparatus or may be set independently. In either case, the image sensing apparatus 101 is freely movable in the physical space.

At least one or more regions 102 such as posters and the like which include characters exist in the physical space to be captured by the image sensing apparatus 101. FIG. 1 illustrates a state in which the image sensing apparatus 101 captures images of the regions 102. In this embodiment, the posters include signs, markers, neon signs, doorway indications, emergency exit indications, posters, flyers, advertisements, and the like. In addition, the posters include all media posted to present information including character information in the physical space.

The position and orientation measuring apparatus 100 measures and outputs the position and orientation of the image sensing apparatus 101 from a captured image including the regions 102, which is captured by the image sensing apparatus 101. The information of the position and orientation of the image sensing apparatus 101 obtained by this apparatus can be used in rendering of virtual objects observed from the image sensing apparatus in, for example, a mixed-reality technique.

Figure 2:
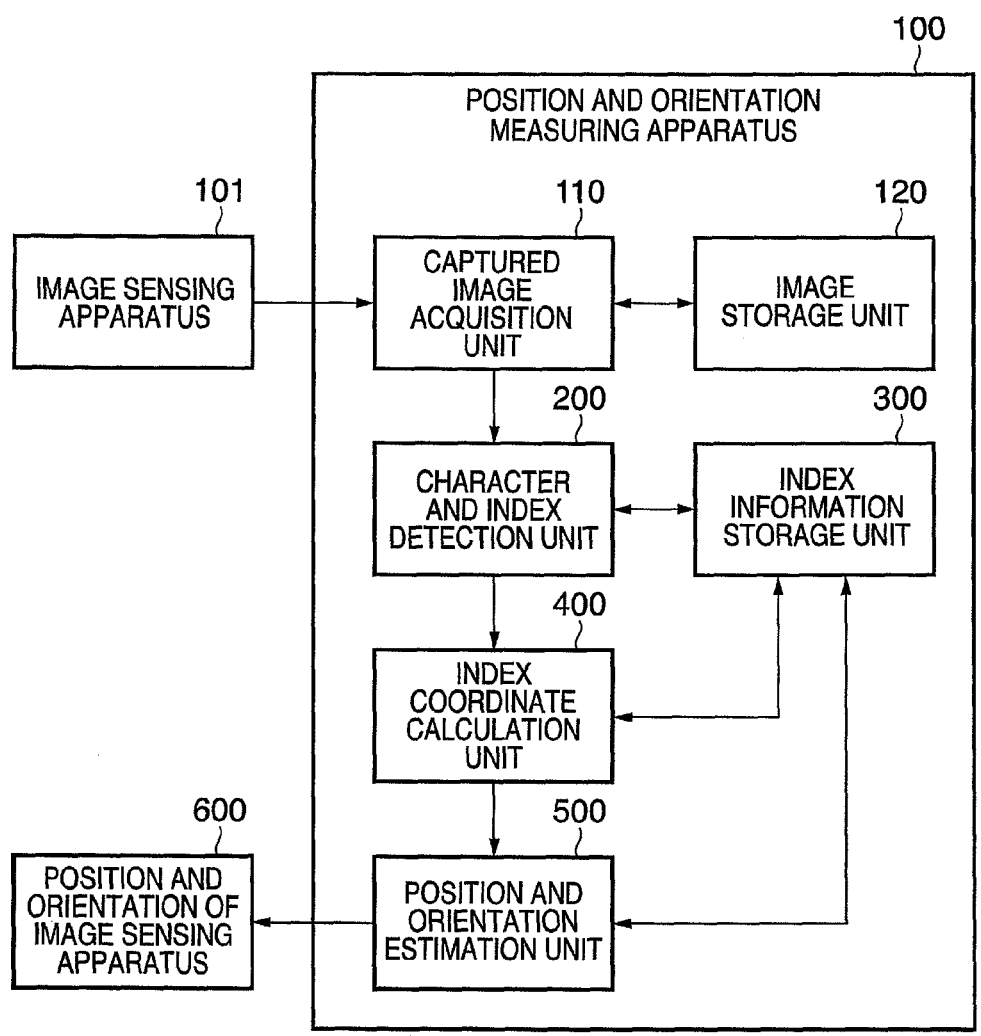
FIG. 2 is a block diagram showing an example of the functional arrangement of the position and orientation measuring apparatus 100 upon connection to the image sensing apparatus 101.

An example of the functional arrangement of the position and orientation measuring apparatus 100 upon connection to the image sensing apparatus 101 will be described below with reference to FIG. 2. The position and orientation measuring apparatus 100 comprises a captured image acquisition unit 110, an image storage unit 120, a character and index detection unit 200, a index information storage unit 300, an index coordinate calculation unit 400, and a position and orientation estimation unit 500.

The captured image acquisition unit 110 receives an image signal obtained by capturing an image of the physical space by the image sensing apparatus 101. The captured image acquisition unit 110 samples the acquired image signal to a format that the subsequent image processing can easily process. For example, the captured image acquisition unit 110 applies A/D-conversion, compression-encoding, and the like to an analog image signal supplied from the image sensing apparatus 101 to convert it into captured image data as digital data. The captured image data is stored in the image storage unit 120. In this way, the image signal captured by the image sensing apparatus 101 can be handled as data that can easily undergo calculation processing.

The index information storage unit 300 is a database which can be referred to by the character and index detection unit 200, the index coordinate calculation unit 400, and the position and orientation estimation unit 500. The index information storage unit 300 is registered with information used in similarity calculations such as template images of character regions as index candidates upon execution of character recognition processing, and position information or layout information (3D coordinate information) of the indices in the physical space. More specifically, the unit 300 is registered with character information required for detection, image information around character regions to be detected, chromaticity, saturation, and brightness values, contours, and geometric features which can be extracted from the indices and image information around the character regions, and the like. Furthermore, the unit 300 is registered with information required for detection of indices other than characters. Note that the registered contents of the index information storage unit 300 are not limited to these. Note also that captured image data suffers distortions depending on the image sensing orientation of the image sensing apparatus 101. Hence, images corresponding to a plurality of orientations are captured in advance, and may be registered in the index information storage unit 300 as templates of character images. Also, a standard character image may be deformed by arithmetic operations in correspondence with a plurality of image sensing orientations, and may be registered as a plurality of character images in the index information storage unit 300. By preparing templates in correspondence with a plurality of image sensing orientations, the detection precision of indices can be enhanced irrespective of the image sensing orientations.

The character and index detection unit 200 detects character regions corresponding to characters (e.g., those in the regions 102 in FIG. 1) which exist in the physical space from the captured image data using the information stored in the index information storage unit 300. Furthermore, the character and index detection unit 200 detects indices other than the character regions. In this embodiment, "index" means a marker which is placed in advance in the physical space, has a known 3D coordinate position, and is used to calculate the position and orientation of the image sensing apparatus.

The index coordinate calculation unit 400 calculates the positions of the character regions and indices in the captured image data based on the detection results of the character regions and indices by the character and index detection unit 200.

The position and orientation estimation unit 500 estimates and outputs a position and orientation 600 of the image sensing apparatus 101 using the positions of the character regions or indices in the captured image calculated by the index coordinate calculation unit 400, and the layout of the character regions or indices in the physical space. The position and orientation of the image sensing apparatus 101 can be expressed by, for example, 3D coordinates, a pan value, a tilt value, and a roll value in the physical space.

Practical examples of the processes to be executed by the respective processing units which configure the position and orientation measuring apparatus 100 will be described below.

<Character and Index Detection Unit 200>

The character and index detection unit 200 executes detection processing of character regions and indices included in the captured image data supplied from the captured image acquisition unit 110. This detection processing can be executed as follows. Note that the detection processing of character regions will be described below.

The character and index detection unit 200 calculates a similarity by comparing a template image of a character saved in the index information storage unit 300 with a predetermined region in the captured image data. When the calculated similarity is equal to or higher than a predetermined threshold, the unit 200 detects that predetermined region as a character region corresponding to the registered character.

Note that the captured image data suffers distortions depending on the image sensing orientations of the image sensing apparatus 101. Hence, images corresponding to a plurality of orientations may be captured in advance, and may be registered in the index information storage unit 300 as templates of character images. Also, a standard character image may be deformed by arithmetic operations in correspondence with a plurality of image sensing orientations, and may be registered as a plurality of character images in the index information storage unit 300.

The detection processing in the character and index detection unit 200 can also be executed by the following method in addition to the aforementioned method.

In general, a character is formed by locally combining a plurality of line segments together. Contours are detected from the captured image data, the similarity of a combination of the contours to a character is calculated, and an image region whose similarity is equal to or higher than a predetermined threshold is detected as a character region.

Line segments which form a character include many kinds of information. If a character is detected from a document image, an optimal image sensing condition is set in advance upon scanning a paper document using a scanner or the like so as to suppress a distortion of the character, thereby exploiting information included in the line segments. However, upon execution of character detection from the captured image data captured by the image sensing apparatus 101 premised on free movement in the physical space, proper image processing is required to exploit information included in the line segments and to efficiently detect a region including characters.

In this embodiment, in order to detect a character region from the captured image, processing for distinguishing the contours of a character in the captured image is executed to detect the contours. Processing for integrating the detected contours is executed to combine separated parts of stroke lines of the character, thus detecting a character region. The detected character region undergoes character recognition using OCR to check if the region of interest is a character region. Note that this embodiment uses a term "OCR" to indicate a character recognition technique required to recognize a character in captured image data using a dictionary generated by preliminary learning. The OCR uses a word dictionary in which characters used in a language to be detected are registered in advance.

A practical example of the character detection processing upon using the OCR will be described below with reference to FIG. 3. In step S300, the character and index detection unit 200 acquires captured image data from the captured image acquisition unit 110. This captured image data includes a character region to be detected in an out-of-focus state due to movement of the image sensing apparatus or the focal length of a lens in many cases. Upon estimating the structure of a character under such condition, it is important to focus on the structural combination of stroke lines that form a character, and character identification with high precision can be attained by exploiting the directional line segments of the contours which form stroke lines and the like as features.

Hence, the character and index detection unit 200 applies image processing for distinctively detecting the contours to the captured image data. More specifically, in steps S301 and S302 the character and index detection unit 200 applies filter processing to the captured image data acquired in step S300 using Gaussian filters which can approximate a point spread function by a Gaussian function and use different variance values. In the first Gaussian filter processing in step S301, the variance value of the Gaussian filter is set to be σ1. In the second Gaussian filter processing in step S302, the variance value of the Gaussian filter is set to be σ2. As an example of the variance values to be set, for example, "1.0" is set in σ1, and "1.4" is set in σ2. However, these setting values are merely examples, and they are desirably changed according to the image quality and resolution.

In step S303, the character and index detection unit 200 executes filter processing for subtracting the brightness value of the captured image data obtained as the processing result in steps S301 and S302. With this processing, a part where the contours exist and a change in brightness is large is emphasized, and contour emphasis similar to the human visual characteristics can be applied to the captured image.

In step S304, the character and index detection unit 200 applies zero-crossing region extraction filter processing to the processing result in step S303. In this zero-crossing region extraction filter processing, a region in which a density change takes place from positive to negative or negative to positive, that is, it passes through a zero density value, is extracted. In this manner, contour parts can be more appropriately extracted.

In step S305, the character and index detection unit 200 applies noise removal filter processing for removing detection errors of small regions which do not form a contour to the processing result in step S304. In this way, the contour parts can be further emphasized, and character detection can be done more efficiently.

Then, in steps S306 to S308 the character and index detection unit 200 detects a character region by contour processing.

Figure 4A:
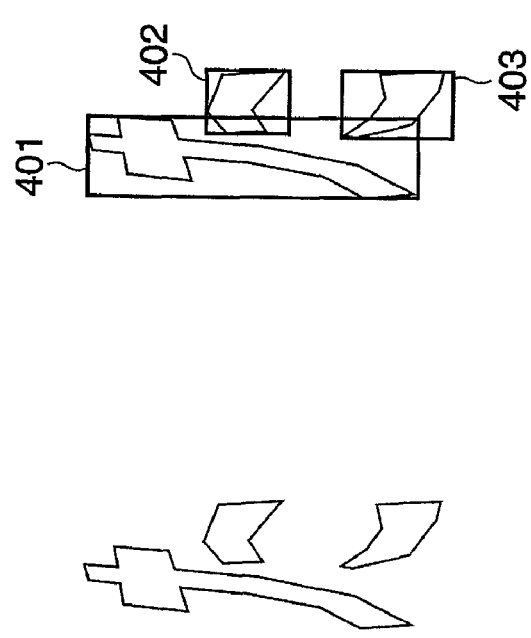
FIGS. 4A to 4D are views for explaining a method of setting circumscribed quadrangles for respective contour closed curves included in captured image data.
Figure 4B:
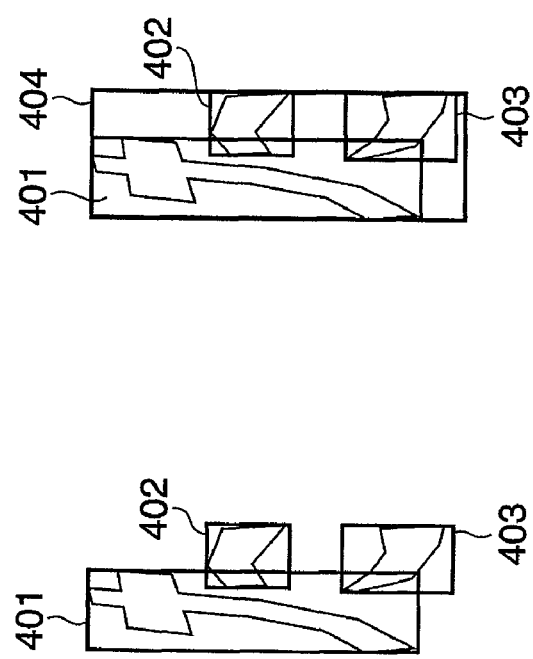

Since the physical space includes many line segments of structures and the like in addition to characters, line segments which form a character must be extracted by excluding these line segments from the detected contours. Compared to contours (line segments) which form structures, those which form a character are normally distributed locally. The contours which form a building or structure have different densities of line segments from those which form a character. Therefore, a character can be detected using the line segment density difference. In step S306, the character and index detection unit 200 sets circumscribed quadrangles for respective contour closed curves included in the captured image data. A practical example of this setting method will be described below with reference to FIGS. 4A to 4D. FIGS. 4A to 4D are views for explaining a method for setting circumscribed quadrangles for contour closed curves included in the captured image data. FIG. 4A shows an example of contour components detected from captured image data obtained by capturing an image of one Japanese syllabary character pronounced as "Ta" from an oblique direction. In order to combine the detected contour components as those which form one character, circumscribed quadrangles of closed curves of the detected contours are set, as shown in FIG. 4B. In the example of FIG. 4B, there are three contour closed curves, and quadrangles 401, 402, and 403 which circumscribe these curves are set. At this time, of the circumscribed quadrangles 401 to 403, the quadrangles 401 and 402, and 401 and 403 have overlapping parts. This is because the contours which form a character tend to be distributed locally, as described above.

Figure 4C:
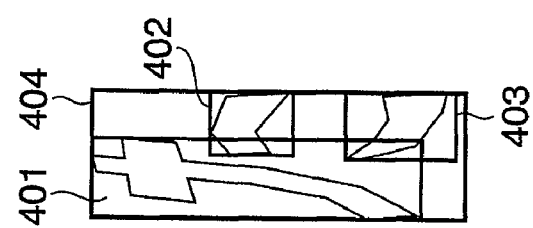
Figure 4D:
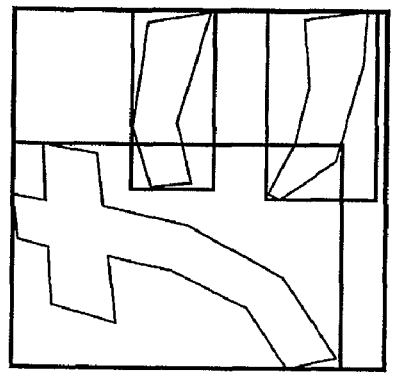

Except for characters in some specific languages, neighboring characters which form a character string have a slight gap. Therefore, by using this gap, neighboring characters in a character string can be separated. However, since stroke lines which form a character may be separated, they must be combined for each character. In step S307, the character and index detection unit 200 groups the neighboring circumscribed quadrangles having the overlapping parts to generate a combined region. For example, as shown in FIG. 4C, a quadrangle 404 that encloses the neighboring circumscribed quadrangles 401 to 403 is set to obtain a combined region in which the circumscribed quadrangles are combined. This embodiment adopts a simple combining rule that circumscribed quadrangles overlap or contact each other. However, in the case of a Chinese character, circumscribed quadrangles may be vertically or horizontally separated like left- and right-hand radicals, and may not always overlap or contact each other in some cases. Hence, a coefficient may be set according to the aspect ratio of the detected circumscribed quadrangles, and contact determination may be done in a region multiplied by the coefficient.

In step S308, the character and index detection unit 200 executes normalization processing of the combined region generated in step S307. In this step, for example, the aspect ratio of the region combined by the quadrangle 404, as shown in FIG. 4C, is normalized (e.g., to adjust the aspect ratio to 1:1). As a result of the normalization processing, a character is deformed to a shape shown in FIG. 4D. With this normalization, even when the character region is distorted due to the image sensing orientation, such distortion can be eliminated. In this way, by absorbing the difference from the OCR dictionary, the identification rate can be increased.

Note that the aforementioned processes do not include any correction about the direction of a character required to cope with a case wherein a character is rotated. By additionally executing the following processing in step S307, the direction of a character image upon application of the OCR can be corrected. Initially, for the region shown in FIG. 4C, line segment direction histograms of the contours are calculated in a plurality of directions, and a direction with a maximum histogram is determined as the top of a character. Then, in the preliminary learning in the OCR, character strings that have undergone the same processing are learned. In this way, even when the image sensing apparatus 101 rotates, the direction of a character in the captured image can be adjusted to that of a character that has been learned in advance. Alternatively, as correction for rotation of a character, a plurality of other characters which are located near a given character may be combined to set a character string region, a baseline (a line connecting the bottoms of characters) of the character string may be obtained, and the rotation may be corrected using the tilt of the baseline.

In step S309 in FIG. 3, the character and index detection unit 200 applies character recognition processing using the OCR to the combined region normalized in step S308. Generally available OCR is often premised on the environment in which characters described on a paper document are recognized by image processing. Therefore, when the shape of a character suffers a distortion depending on the image sensing direction of the image sensing apparatus 101 like in this embodiment, the identification rate drops if the same dictionary as that for a paper document is used. Hence, characters obtained by applying processing to their contours, as described above, are preliminarily learned to generate a dictionary, thus increasing the identification rate. Since characters to be detected in this embodiment are printed characters, it is easy to learn a dictionary having a plurality of character shapes if contour information extracted from font data used in a computer is used.

In the character recognition processing in step S309, feature information extracted from each normalized combined region in the captured image data is selected in turn, and is compared with that feature information included in the dictionary obtained by preliminary learning. With this comparison, similarities are calculated, and a maximum similarity for each combined region is calculated.

In step S310, the character and index detection unit 200 compares the similarity output as the character recognition result in step S309 with a predetermined threshold value. As a result of this comparison, if the similarity is lower than the threshold ("NO" in step S310), the process advances to that in step S312. In this case, it is determined that the combined region which is to undergo the character recognition includes (some of) contours that form a structure included in the captured image data. Hence, the unit 200 discards that combined region, and the process returns to step S309 to apply the character recognition processing to another combined region.

On the other hand, if the similarity assumes a value equal to or higher than the threshold ("YES" in step S310), the process advances to that in step S311. In step S311, the character and index detection unit 200 outputs the character detection result to the index coordinate calculation unit 400. At this time, information associated with the detected character region is output to the index coordinate calculation unit 400.

The character and index detection unit 200 checks in step S313 if processing for all the combined regions that have undergone the normalization processing in step S308 is complete. If the processing is complete ("YES" in step S313), this processing ends. On the other hand, if the combined regions to be processed still remain ("NO" in step S313), the process returns to step S309 to continue the processing.

Note that the arrangement for executing the processing corresponding to the flowchart shown in FIG. 3 can be implemented by combining a dedicated integrated circuit that executes the image processing, and a determination circuit that applies OCR.

In the description of the character detection processing related to FIG. 3 above, a single character is handled upon generation of the combined region. Also, a set of a plurality of characters can be handled as a character string.

Since one character alone is rarely used, it is effective to manage a set of a plurality of characters, that is, a character string so as to improve the identification rate in the character recognition processing. As for the relation between neighboring characters which form a character string, neighboring parts which have similar chromaticity values, circumscribed areas of contours, and the like described above can be assumed as a character string. In this case, the character string may not have a readable direction (vertical writing, horizontal writing), but it does not pose any problem upon identifying an index.

Furthermore, if an area where the image sensing apparatus 101 exists does not include any character which is the same as a given character, it is relatively easy to associate that character with registered information in the index information storage unit 300. On the other hand, if that area includes a plurality of identical characters, it is difficult to associate them with the registered information. Hence, by handling a character string as a set of a plurality of characters in place of a single character, association with the registered information can be facilitated.

By detecting one or more combinations of feature amounts associated with a character, the processing time can be effectively shortened. The processing upon handling a set of characters as a character string will be described below.

Figure 5A:
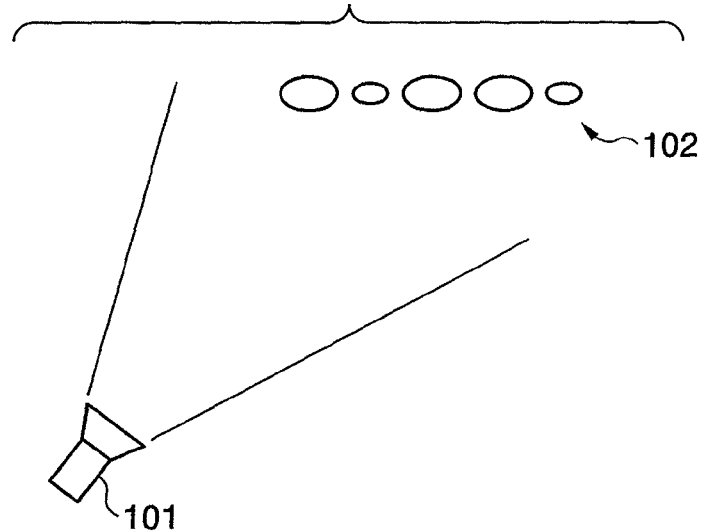
FIGS. 5A to 5C are views for explaining a method of eliminating distortions of characters when the image sensing apparatus 101 obliquely captures an image of a region 102 including characters according to the second embodiment.

When the image sensing direction of the image sensing apparatus 101 agrees with a normal to the plane including a character string to be captured, it is relatively easy to compare the character string in the captured image data with reference character strings in the dictionary used in the character recognition processing. However, in a situation in which an image is captured by freely moving the image sensing apparatus 101, the image sensing direction of the image sensing apparatus 101 and the plane including the character string to be captured have an arbitrary positional relationship, and the image sensing direction does not always agree with a normal to the plane. In this case, the image sensing apparatus 101 often obliquely captures an image of the character string, as shown in FIG. 5A. FIG. 5A illustrates an example of a state in which the image sensing apparatus 101 obliquely captures an image of the region 102 including characters. Note that FIGS. 5A to 5C are views for explaining a method of eliminating a distortion of characters when the image sensing apparatus 101 obliquely captures an image of the region 102 including characters.

Figure 5B:
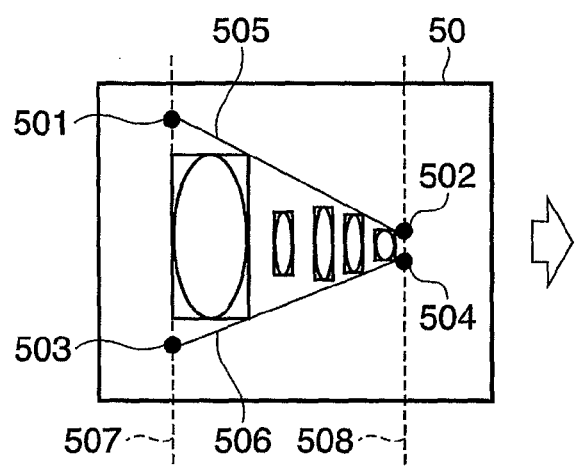
Figure 5C:
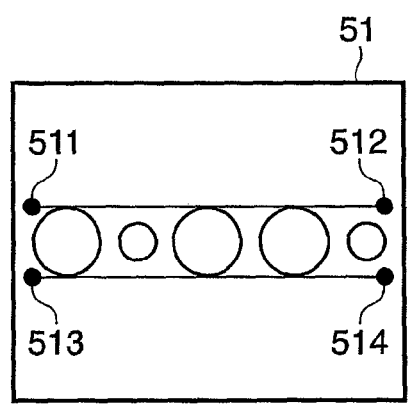

FIG. 5B shows an example of captured image data captured in the sate shown in FIG. 5A. In FIG. 5B, the region 102 including characters is projected askew on captured image data 50 captured by the image sensing apparatus 101 in relation to the image sensing position. That is, on the captured image data 50, characters located closer to the image sensing apparatus 101 are projected to have larger sizes, and those located farther from the image sensing apparatus 101 are projected to have smaller sizes. In order to correct such distortion, the following processing can be done.

By exploiting the combined results of the neighboring circumscribed quadrangles in step S307 in the flowchart of FIG. 3 above, a set of combined regions which do not contact or overlap each other but are close to each other is considered as a character string. Lines which contact rectangles of the combined regions are set like a line segment 505 which connects vertices 501 and 502, and a line segment 506 which connects vertices 503 and 504. At this time, by matching the positions in the horizontal direction on the drawing (those indicated by dotted lines 507 and 508) of the end points of the line segments, that is, the vertices 501 to 504 to the left and right end sides of a rectangle including the combined regions, only a character region can be handled.

A quadrangle bounded by the vertices 501 to 504 that circumscribe the region including characters undergoes keystone distortion correction to correct the shape of the quadrangle to a rectangular shape. Since this keystone distortion correction is a state-of-the-art technique, a detailed description thereof will not be given in this specification for the sake of simplicity. FIG. 5C shows an image 51 after this keystone distortion correction. In FIG. 5C, the image 51 includes a rectangular region bounded by vertices 511 to 514 corresponding to the vertices 501 to 504. Characters included in the rectangular region are free from any distortion based on the image sensing condition by the keystone distortion correction. In this way, a set of combined regions can be handled as a character string, and the distortion of characters due to the image sensing orientation can be eliminated.

The aforementioned processing can be done in combination with the normalization processing of the combined regions in step S308. As a result, the identification rate in the character recognition processing in step S309 and subsequent steps can be further improved.

Note that the captured image data 51 shown in FIG. 5C obtained by applying the keystone distortion correction to the captured image data 50 in FIG. 5B can be used as a registered image used upon execution of the character recognition processing. Also, an original image may undergo image deformation to generate templates that assume a plurality of image sensing orientations upon image registration, and these templates may be registered in association with the original image. In this way, the identification rate drop of character recognition due to image distortions based on a change in orientation of the image sensing apparatus can be effectively reduced. Note that as the image deformation method, an affine deformation or a deformation using a relational expression of plane homography may be applied.

<Index Coordinate Calculation Unit 400>

The index coordinate calculation unit 400 will be described below. The index coordinate calculation unit 400 calculates information of the projected position of characters serving as an index on the captured image data from the character region detected by the character and index detection unit 200.

Figure 7A:
FIGS. 7A to 7C are views showing a practical example of an index and an example of captured image data obtained by capturing an image of the index so as to explain the processing in an index coordinate calculation unit 400.
Figure 7B:
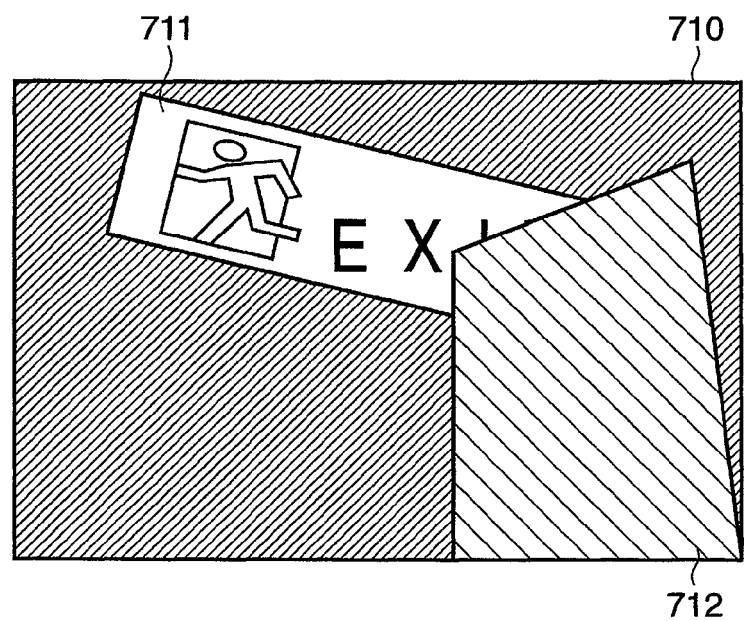
Figure 7C:
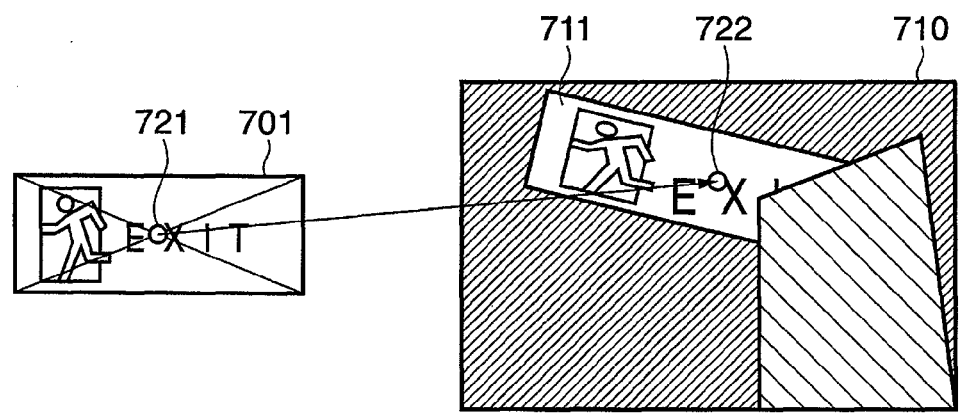
Figure 8:
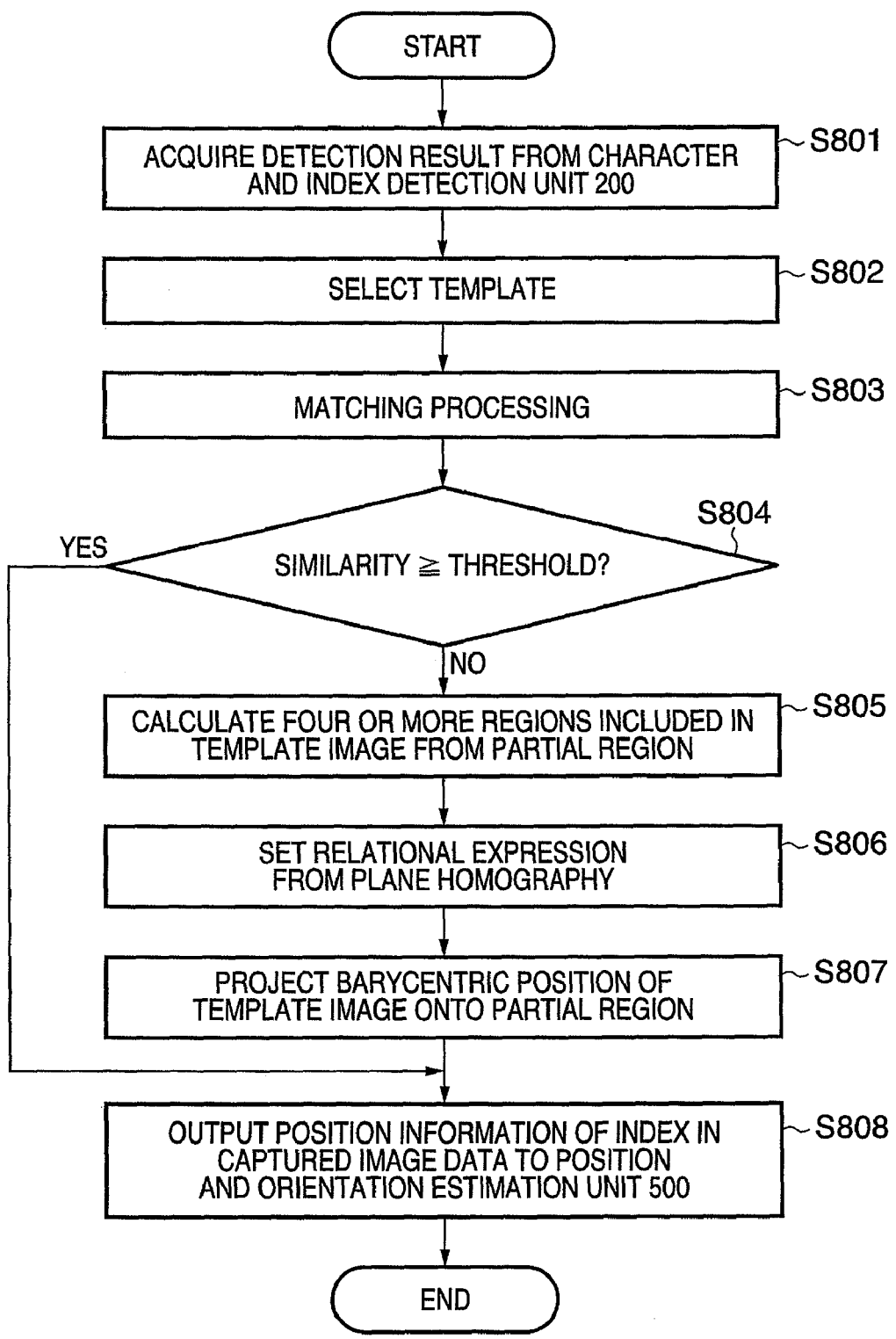
FIG. 8 is a flowchart showing an example of the processing in the index coordinate calculation unit 400.

An example of the processing in the index coordinate calculation unit 400 will be described below with reference to FIGS. 7A to 7C and FIG. 8. A calculation example of the position of an index in the physical space on the captured image data using the characters detected by the character and index detection unit 200 and surrounding image information in particular will be explained below. FIGS. 7A to 7C are views showing a practical example of an index and an example of captured image data obtained by capturing an image of that index so as to explain the processing in the index coordinate calculation unit 400. FIG. 8 is a flowchart showing an example of the processing in the index coordinate calculation unit 400.

For example, a case will be examined wherein a poster indicating an emergency exit is used as an index, as shown in FIG. 7A. In this case, four letters of the alphabet in "EXIT", a character string obtained by combining these four letters, and an image around the character string are registered in the index information storage unit 300 as template images together with a template image 701 of the poster. In the index information storage unit 300, position information (3D coordinates) in the physical space is registered in association with each template image. The position information represents, for example, the barycentric position of each template image. Note that the barycentric position is the position of the intersection of diagonal lines which connect the vertices of the template image 701, as shown in, e.g., FIG. 7C.

The index coordinate calculation unit 400 acquires the detection result of characters and the like detected by the character and index detection unit 200 in step S801. In step S802, the unit 400 selects the template image 701 registered in the index information storage unit 300 in accordance with the contents of the acquired detection result.

In step S803, the index coordinate calculation unit 400 executes matching processing with the captured image data using the selected template image 701 to calculate similarities. As a result, if a matching position whose similarity is equal to or higher than a threshold is found ("YES" in step S804), the process jumps to step S808. In step S808, the unit 400 outputs position information of an index in the captured image data to the position and orientation estimation unit 500 based on the matching position whose similarity is equal to or higher than the threshold. The position information in the captured image data corresponding to that of the index in the physical space, that is, the position information on the captured image corresponding to the barycentric position of the index in this embodiment, is output.

On the other hand, if a matching position whose similarity is equal to or higher than the threshold cannot be found ("NO" in step S804), the process advances to step S805.

The region 102 as the poster shown in FIG. 7A is normally placed at a public position. However, depending on the orientation position of the image sensing apparatus 101, the region 102 may be partially occluded by a wall or structure, and may not be entirely included in the captured image data. For example, as shown in FIG. 7B, in captured image data 710, a part of a poster 711 indicating the emergency exit is often occluded by a door 712. In such state, even when matching is done using the template image 701 associated with the poster, it is difficult to associate the poster 711 in the captured image data 710 with the registered information since it has a different orientation and size from those of the registered information, and is partially occluded. As a result, the similarity is smaller than the threshold.

In this case, the index coordinate calculation unit 400 calculates four or more regions included in the template image 701 from the partial region 711 from which characters and the like corresponding to the template image 701 are detected in the captured image data 710. Since the partial region 711 includes characters, four or more regions included in the template image 701 can be calculated using the vertex coordinates of acute-angled parts of the contours which form stroke lines of the characters.

In step S806, the index coordinate calculation unit 400 calculates a relational expression between two images, that is, the captured image data and template image 701 from the relation of plane homography.

The sequence for calculating the relational expression of plane homography will be described below. Assume that the focal length, lens distortion, and the like as internal parameters of the image sensing apparatus 101 are given to define a normalized camera having a focal length=1. Also, assume that a target index is formed on a 3D plane. Let M' be the position, on a camera coordinate system, of a point P which forms an index character at the camera position where the template image 701 is captured. Then, an orientation M of the image sensing apparatus 101 which captures the captured image data is expressed, on the camera coordinate system defined by multiplying the image sensing orientation of the template image 701 by a rotation matrix R and adding a translation t to the product, by:

$$M = RM' + t \tag{1}$$

Let n be a normal vector to a plane including the point p, and d be the distance from the coordinate origin of the camera coordinate system to that plane. Then, an equation of the plane on the camera coordinate system upon capturing the captured image is described by:

$$n^T M' = d \quad (2)$$

Substitution of equation (2) into equation (1) yields:

$$M = (R + tn^T/d)M' \quad (3)$$

Using digital image coordinates m and m' in two normalized cameras in place of M and M', a relational expression of plane homography is described by:

$$sm = Hm' \quad (4)$$

where s is a scalar, and H is given by:

$$H = A(R + tn^T/d)(A')^{-1} \quad (5)$$

where A and A' are matrices indicating internal parameters of the cameras, and are calculated in advance. From this equation, since there are eight unknown parameters of R, t, n, and d, the relation between the orientations of the two captured images onto which corresponding four points on an identical 3D plane are projected can be calculated.

In step S807, the index coordinate calculation unit 400 projects a barycentric position 721 of the template image 701 onto the captured image data 710 based on the relational expression of plane homography to calculate a barycentric position 722 of the character region as an index in the partial region 711. For example, as shown in FIG. 7C, the position 722 of the partial region 711 in the captured image data 710 corresponding to the barycentric position 721 of the template image 701 can be calculated.

In step S808, the index coordinate calculation unit 400 outputs the position information of the barycenter 722 of the character region as the index of the captured image calculated on the captured image data 710 to the position and orientation estimation unit 500 as that of the index.

Note that the template image 701 is desirably registered in the index information storage unit 300 after it undergoes image deformation while assuming states that observe the poster 701 from a plurality of image sensing orientations. As this image deformation, if that using the relational expression of plane homography is done, parameters of scales corresponding to the image sensing angle and distance are obtained. Hence, these image sensing orientation parameters are preferably registered in association with deformed images. If affine deformation is used as the image deformation, the same effects can be obtained, although the precision drops.

<Position and Orientation Estimation Unit 500>

The position and orientation estimation unit 500 estimates and outputs the position and orientation 600 of the image sensing apparatus 101 using the position of the character region or index in the captured image calculated by the index coordinate calculation unit 400, and the allocation of the character region or index in the physical space. The position and orientation estimation unit 500 estimates the position and orientation 600 of the image sensing apparatus 101, and optimizes the estimated position and orientation to minimize errors between the position of the index projected into the captured image and that of the index in the image calculated by the index coordinate calculation unit 400 based on the estimation.

For example, the position and orientation of the image sensing apparatus can be estimated using the position and orientation estimation method of the image sensing apparatus based on a plurality of indices, which is disclosed in U.S. Pat. No. 6,993,450, to have the barycentric positions of figures of a plurality of detected character regions as projected coordinates of indices. Even when only one character is detected as an index, if four or more end points which form stroke lines of the character can be associated, the position and orientation of the image sensing apparatus 101 can be estimated by the same method.

Furthermore, in the position and orientation estimation unit 500, an index whose position information in the physical space is known need only be associated with its projected position on the captured image data. Hence, at a place where the use environment allows setting an index in advance, indices having other geometric or color features may be used together.

As described above, according to the present invention, by detecting characters in a poster which already exists in physical space and using them as an index, the position and orientation of the image sensing apparatus can be measured even in a wide-area place such as town where indices are hard to be set in advance.

Second Embodiment

As the second embodiment, another processing example in the character and index detection unit 200 will be described. Note that a repetitive description of the same arrangement and processing as those in the first embodiment will be avoided.

In the character recognition processing in the character and index detection unit 200 of the first embodiment, when a large number of contours are detected, the processing time increases accordingly. Also, when the character recognition processing must be done using a plurality of languages, the search time in the index information storage unit 300 also increases. Increases in these processing times may often pose a problem when the position and orientation measuring apparatus 100 is used in the MR technique.

For example, the MR system requires processing in real time, that is, the position and orientation measuring apparatus 100 must estimate the position and orientation for an image signal periodically output from the image sensing apparatus 101 before the next image signal is output. If the character recognition processing based on the OCR spends too much time, it becomes difficult to meet a real time requirement. Hence, the character recognition processing needs be sped up.

In general, in a poster having characters as an index, characters are often combined with character peripheral information such as other images, line segments, and the like. Upon specifying that index, not only the characters but also the character peripheral information can be used. The use of such character peripheral information is also effective when characters in the captured image data are illegible in relation to the image sensing position and resolution of the image sensing apparatus 101, and the character recognition processing based on the OCR is impossible.

In this manner, by using not only characters but also information of images and line segments which are present around the characters, the character recognition processing can be done more quickly than that based only on the information of characters. Hence, the real time requirement can be met. Hence, in the index information storage unit 300, not only information of characters detected by the character and index detection unit 200 but also character peripheral information are registered together. As a result, the character and index detection unit 200 can implement character detection using pattern matching of images.

Figure 6:
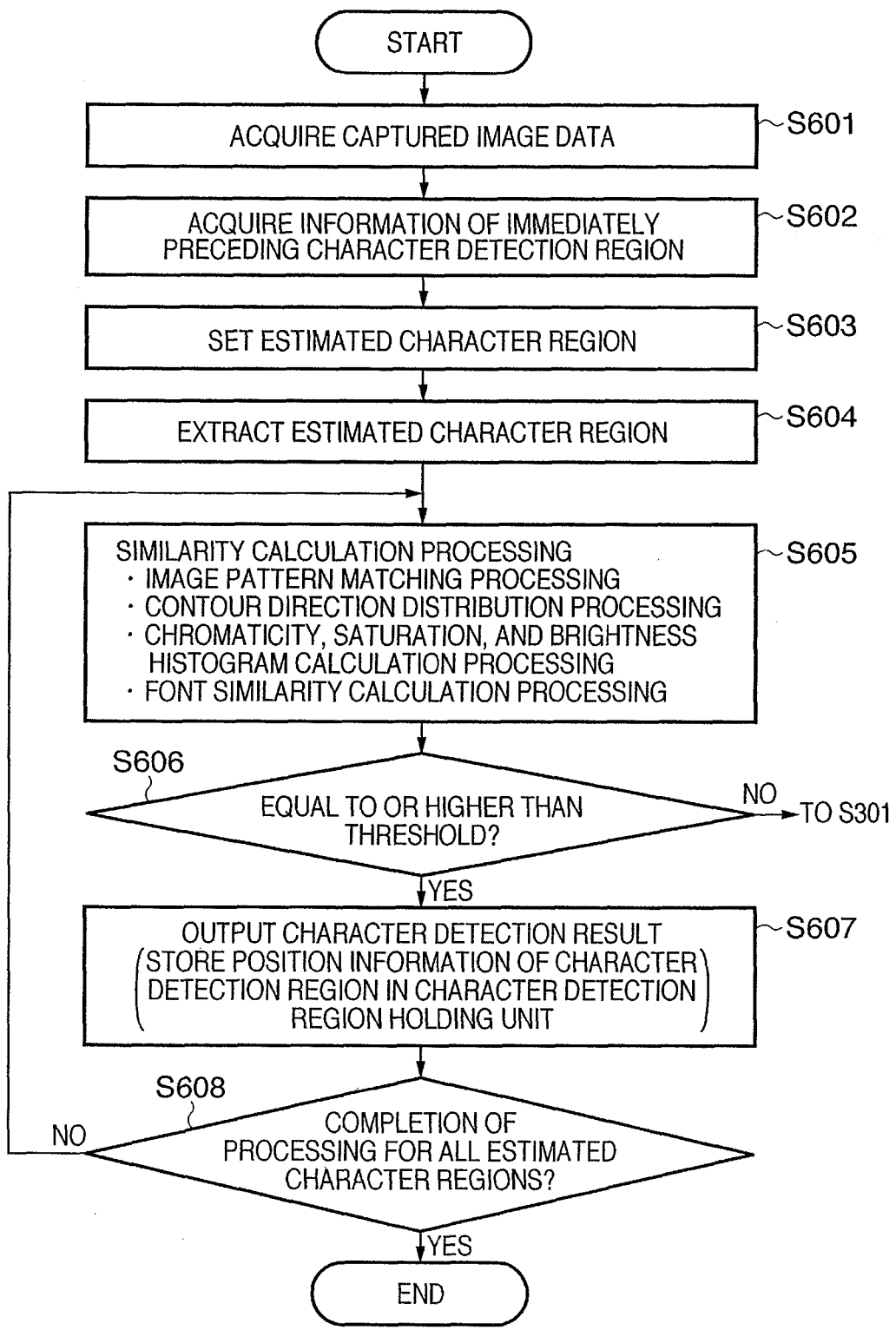
FIG. 6 is a flowchart showing an example of character detection processing according to the second embodiment.

An example of the character detection processing in the character and index detection unit 200 according to this embodiment will be described below with reference to FIG. 6. FIG. 6 is a flowchart showing an example of the character detection processing according to this embodiment.

Referring to FIG. 6, the character and index detection unit 200 acquires captured image data from the captured image acquisition unit 110 in step S601. To this captured image data, the region 102 including character information in a poster present in the physical space is projected.

Assuming that the image sensing apparatus 101 moves very slightly with respect to the image sensing rate (normally, 30 frames per second), regions captured at the immediately preceding position and the current position of the image sensing apparatus 101 have slight motion between them. Hence, it is estimated that the character region in the captured image data captured by the image sensing apparatus 101 at the current image sensing position does not deviate much from the position of the character region in the captured image data processed at the immediately preceding timing.

Hence, in step S602 the character and index detection unit 200 acquires information of the character detection region in the immediately preceding character detection processing. The character and index detection unit 200 of the second embodiment comprises a character detection region holding unit, which holds the information of the character detection region corresponding to the detection result in the captured image data processed at the immediately preceding timing. In step S602, the unit 200 acquires the information of the character detection region from this character detection region holding unit.

In step S603, the character and index detection unit 200 sets a region where it is predicted that characters exist (predicted character region). Initially, the unit 200 estimates the position and orientation of the image sensing apparatus 101 at the current timing by deriving the moving speed of the image sensing apparatus 101 and the like based on the information of the previous position and orientation of the image sensing apparatus 101 acquired from the position and orientation estimation unit 500. Next, the unit 200 expands the immediately preceding character detection region acquired in step S602 based on the estimated position and orientation to set a predicted character region. Note that estimation of the position and orientation may be executed while including errors using, for example, a Kalman filter.

Next, in step S604 the character and index detection unit 200 executes processing for extracting the region set in step S603 from the captured image data. As a result, since the processing volume is reduced compared to the character detection processing for the entire captured image data, the processing time is expected to be shortened.

In step S605, the character and index detection unit 200 calculates similarities using a plurality of types of similarity calculation processing in an integrated manner. More specifically, as the similarity calculation processing, image pattern matching processing, contour direction distribution calculation processing, chromaticity, saturation, and brightness histogram calculation processing, and font similarity calculation processing can be done.

In the image pattern matching processing, the correlation between the registered image registered in the index information storage unit 300 and the image of the predicted character region extracted in step S604 is calculated as a similarity. In the contour direction distribution calculation processing, the directions and the number of contours included in the image of the extracted predicted character region are calculated, and are compared with those in the registered image registered in the index information storage unit 300, thus calculating a similarity. At this time, in order to clarify the contours, the processes in steps S301 to S305 in FIG. 3 can be executed. Note that the processes in steps S301 to S305 may be executed in advance before acquisition of the captured image data in step S601.

In the chromaticity, saturation, and brightness histogram calculation processing, color feature amounts included in the image of the extracted predicted character region are calculated, and are compared with those of the registered image registered in the index information storage unit 300, thereby calculating a similarity. In the font similarity calculation processing, a similarity between the shape formed by the contours in the image of the extracted predicted character region, and the character shape of a specific font registered in the index information storage unit 300 is calculated.

In step S606, the character and index detection unit 200 compares the similarities calculated in step S605 with thresholds which are set in advance for respective processes. If the thresholds are equal to or higher than the thresholds ("YES" in step S606), it is determined that the predicted character region extracted in step S604 includes a predetermined character string used as the reference upon calculating the similarities. Hence, the process advances to step S607 to output the character detection result. At this time, the position information of the character detection region in the captured image data is registered in the character detection region holding unit at the same time.

The character and index detection unit 200 checks in step S608 if the processing for images of all the predicted character regions extracted in step S604 is complete. If the processing is complete ("YES" in step S608), this processing ends. On the other hand, if images to be processed still remain ("NO" in step S608), the process returns to step S605 to continue the processing.

On the other hand, if the similarities are smaller than the thresholds ("NO" in step S605), it is determined that the orientation of the image sensing apparatus 101 has changed abruptly, and characters no longer exist in the predicted character region. Hence, the character recognition processing in step S301 and subsequent steps in FIG. 3 is executed.

As described above, the character detection can be efficiently executed using the existing character detection result. In the above description, the image pattern matching processing, contour direction distribution calculation processing, chromaticity, saturation, and brightness histogram calculation processing, and font similarity calculation processing are executed to calculate similarities. However, the present invention is not limited to this, and the character region can also be effectively detected using, for example, the following feature amounts.

For example, even when the captured characters appear as a closeup in the captured image data, or when some characters are occluded due to the image sensing orientation, an incomplete part is covered by determining the compatibility of partial features of the contours which form characters, thus detecting a character region. For this purpose, the index information storage unit 300 must register information of the contours of characters used upon character detection.

A partial character string used in a poster often uses an identical font, and has a lot in common in terms of design. Therefore, if the font of one character in the character string can be specified, the similarity calculation processing for characters of different fonts can be omitted for the remaining characters. Hence, in the index information storage unit 300, respective pieces of registered character information are classified in correspondence with fonts, thus effectively improving the search efficiency.

Furthermore, color information which forms a character is important. The color of a character is designed so that the character is legible to be separated from the background. Hence, by registering information of the chromaticity, saturation, and brightness values of characters and their surrounding region in the index information storage unit 300 together, even when identical captured image data includes a plurality of identical character strings, characters that can be used as an index can be distinctively detected.

Likewise, by registering information of line segments and the like which neighbor characters in the index information storage unit 300 together, if characters, line segments, and the like exist on a poster such as a sign, poster, or the like, such information can be used as an index other than characters. In this case, even when the image sensing distance becomes large, the character region in the captured image data becomes small, and it is difficult to extract features about characters, character detection can be made using surrounding global features.

Third Embodiment

In the above embodiments, an index including a character region which can be used to estimate the position and orientation of the image sensing apparatus 101 must have a known position on a coordinate system used in the position and orientation of the camera in the position and orientation estimation unit 500. For this reason, an index whose position is measured in advance by a length-measuring device or the like can be used, and position information of a character upon printing can be used. However, in consideration of use outside an assumed area, handling of a character whose position is not known becomes an issue.

Figure 9:
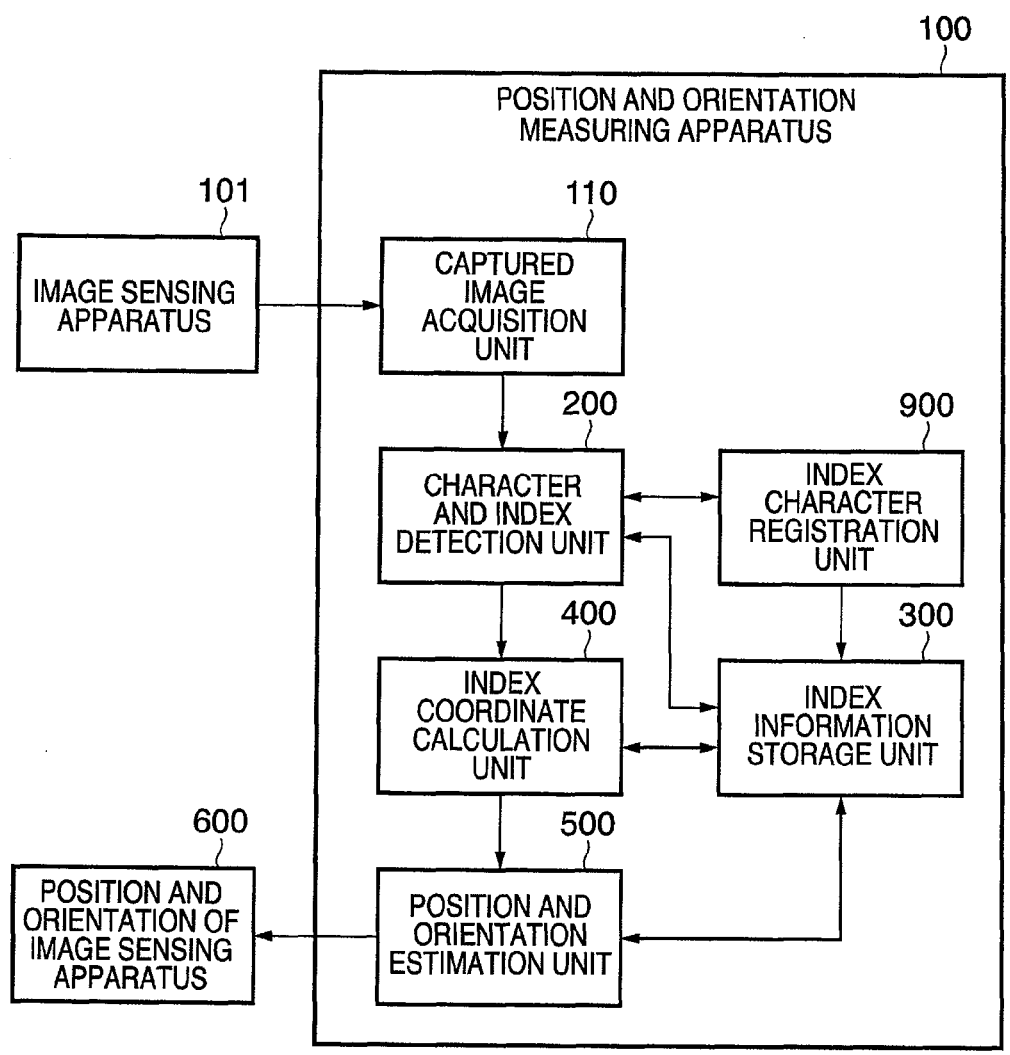
FIG. 9 is a block diagram showing an example of the arrangement when the position and orientation measuring apparatus 100 comprises an index character registration unit 900 used to register information about non-registered characters in the third embodiment.

FIG. 9 is a block diagram showing an example of the arrangement when the position and orientation measuring apparatus 100 comprises an index character registration unit 900 used to register information about unregistered characters by the character and index detection unit 200. When the 3D position of a character or index is unknown, this index character registration unit 900 calculates that position by bundle adjustment used in the photogrammetry using the projected position on the image sensing frame of the identical character or index, which is captured and detected with a different parallax. The index character registration unit 900 registers the information of the 3D position obtained as a result of this processing in the index information storage unit 300. Note that the bundle adjustment is a method of making an optimization calculation to minimize errors on the projected frame of the position and orientation of the camera and the coordinates of a point on the physical space, and is a general method in the field of phototopography.

By adding this index character registration unit 900, even a character and index detection result, which is indefinite in an initial process, is stored as an index in the index information storage unit 300 during movement within the area, and can be effectively used in the position and orientation estimation of the camera.

Since the processing in the index character registration unit 900 can be executed at an arbitrary timing, it can be executed at an arbitrary timing before execution of the position and orientation estimation by the position and orientation measuring apparatus 100. Hence, when a plurality of users use the position and orientation measuring apparatus 100, the processing of the index character registration unit 900 is executed in advance to register the 3D position information of a character or index, which is unknown so far in the index information storage unit 300. Since the registered result can be shared using predetermined communication means, other users can use the position and orientation measuring apparatus 100 if they do not execute the processing of the index character registration unit 900.

Fourth Embodiment

Figure 10:
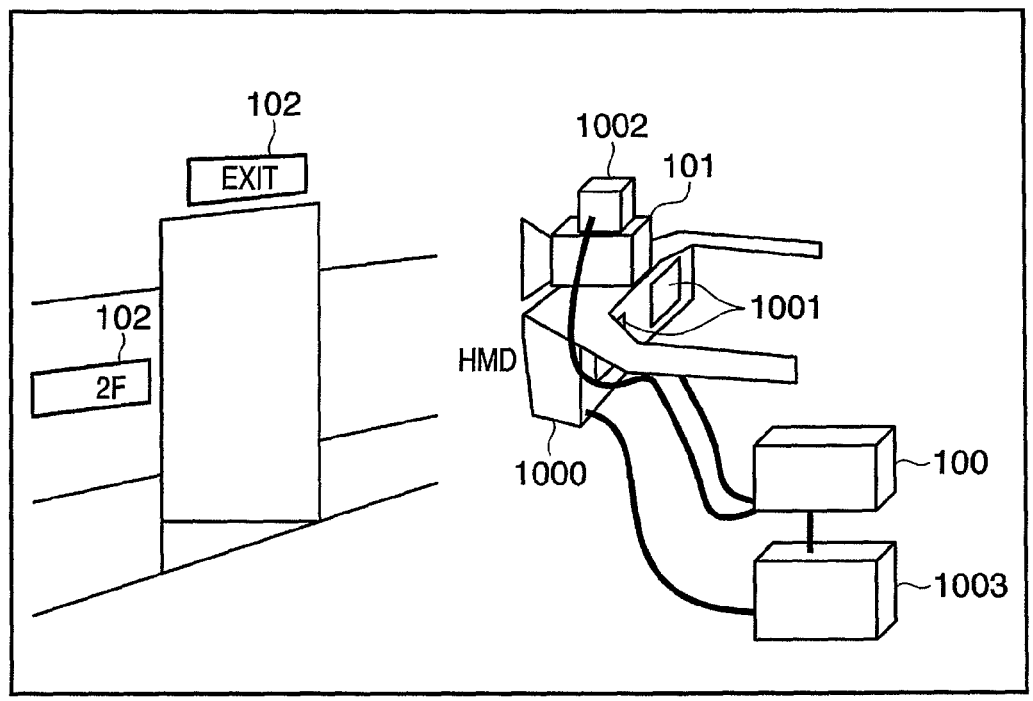
FIG. 10 is a view showing an example when the position and orientation measuring apparatus 100 is applied to a head-mounted display (HMD) 1000 according to the fourth embodiment.

This embodiment will explain a case wherein the position and orientation measuring apparatus described in the above embodiments is applied to a head-mounted display (HMD) 1000 as an MR system. FIG. 10 is a view showing an example when the position and orientation measuring apparatus 100 is applied to the HMD 1000.

The HMD 1000 has an image sensing apparatus 101, an orientation measuring apparatus 1002, and a display 1001. The user who wears the HMD 1000 can move in the physical space. The image sensing apparatus 101 captures an image of the physical space, and outputs a signal representing the captured image to the position and orientation measuring apparatus 100. The orientation measuring apparatus 1002 is also connected to the position and orientation measuring apparatus 100, and measures tilt angles of the HMD 1000 in the direction of the gravity based on the principle of a vibration gyro or the like. The display 1001 can display an image, and normally includes two displays for the right and left eyes.

A virtual object composition apparatus 1003 is connected to the position and orientation measuring apparatus 100. This virtual object composition apparatus 1003 three-dimensionally renders a virtual object to be superimposed on the physical space based on the position and orientation of the image sensing apparatus 101 output from the position and orientation measuring apparatus 100, and combines and outputs the virtual object and the captured image data of the image sensing apparatus 101. For example, the virtual object composition apparatus 1003 can also be implemented by, for example, a computer having a graphics rendering device.

Note that this embodiment will exemplify the HMD 1000 on which the image sensing apparatus 101, orientation measuring apparatus 1002, and display 1001 are fixed. However, the image sensing apparatus 101 and orientation measuring apparatus 1002 need only have a fixed positional relationship, and the display 1001 need not always be fixed to these two apparatuses nor always be incorporated in the HMD 1000.

Figure 11:
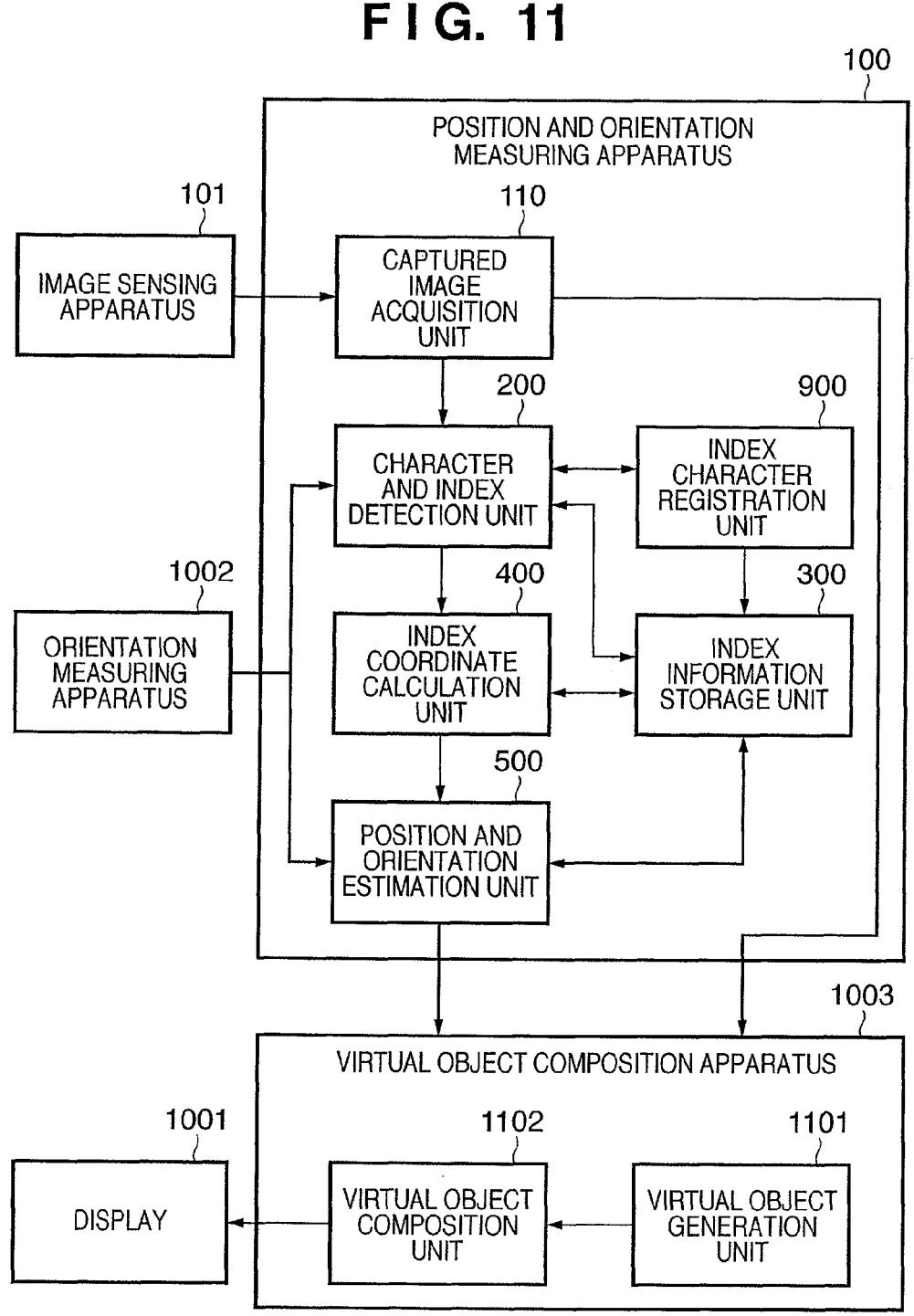
FIG. 11 is a block diagram showing an example of the functional arrangement corresponding to the view shown in FIG. 10.

FIG. 11 is a block diagram showing an example of the functional arrangement corresponding to the view shown in FIG. 10. The orientation measuring apparatus 1002 which detects the orientation of the image sensing apparatus 101 detects tilt angles in the direction of gravity. The character and index detection unit 200 and the position and orientation estimation unit 500 can use the output from the orientation measuring apparatus 1002 as subsidiary information. As a result, since the processing exploits the fact that most character strings and allocations of posters placed in the physical space are set perpendicular to the direction of gravity, estimation for a rotation and the like can be easily made. Even when character detection is lost in the estimated character region, the estimation range can be effectively calculated with high precision by calculating a change in orientation of the image sensing apparatus 101.

The virtual object composition apparatus 1003 receives the captured image data and signals associated with the position and orientation from the position and orientation measuring apparatus 100. The virtual object composition apparatus 1003 comprises a virtual object generation unit 1101 and a virtual object composition unit 1102. The virtual object generation unit 1101 generates a virtual object to be rendered in correspondence with the position and orientation. The virtual object composition unit 1102 combines the virtual object generated by the virtual object generation unit 1101 and the captured image data, that is, combines an image of the virtual object to be observed from the position and orientation of the image sensing apparatus onto the image of the physical space, and outputs the composite image as a video signal. The video signal output from the virtual object composition apparatus 1003 is displayed on the display 1001 attached to the HMD 1000, so that the user can observe an image. In this way, an image based on mixed reality can be presented to the user using the position and orientation measuring apparatus 100.

Other Embodiments

Note that the aforementioned arrangement examples have been explained as embodiments, but an apparatus which can implement the image sensing apparatus and position and orientation measuring apparatus need only be provided, and when processing is executed in the form of a program that implements the processing arrangement of the present invention by a mobile phone or portable computer, the same effects can be obtained. Furthermore, a secondary service that presents information about neighboring facilities and places using the position and orientation measurement results may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-214883, filed Aug. 7, 2006 which is hereby incorporated by reference herein in its entirety.

What is claimed is:

1. A position and orientation measuring apparatus comprising:
   a storage unit constructed to store character region specifying information and position information in association with a character region placed in a physical space;
   a character region detection unit constructed to detect a character region from first captured image data obtained by capturing an image of the physical space by an image sensing apparatus, using the character region specifying information stored in the storage unit;
   an image position information detection unit constructed to detect image position information of an index corresponding to the detected character region; and
   an estimation unit constructed to estimate a position and orientation of the image sensing apparatus upon capturing the captured image data based on image position information of the detected character region, in the first captured image data, and the position information which is stored in the storage unit and corresponds to the detected character region,
   wherein the character region detection unit comprises:
   a contour extraction unit constructed to extract contours in the captured image data;
   a setting unit constructed to set a character region candidate using the contours;
   a normalization processing unit constructed to normalize a size of the character region candidate; and
   a character recognition processing unit constructed to apply character recognition processing to the normalized character region candidate.

2. The apparatus according to claim 1, wherein when the character region is included in a poster placed in the physical space,
   the storage unit stores, as information associated with a character, image information around the character region in the poster, and
   the character region detection unit detects the character region further using the image information around the character region.

3. The apparatus according to claim 1, wherein the image position information detection unit comprises:
   a save unit constructed to save position information of a character region detected from captured image data captured by the image sensing apparatus at an immediately preceding timing; and
   a region estimation unit constructed to estimate an image region corresponding to the character region in the first captured image data based on the saved position information.

4. The apparatus according to claim 1, further comprising a registration unit constructed to calculate position information associated with a character region, which is not registered in the storage unit, using a different parallax image, and to register the calculated position information in the storage unit together with image data of the non-registered character region.

5. A mixed reality system comprising:
   an image sensing apparatus;
   a position and orientation measuring apparatus comprising:
   a storage unit constructed to store character region specifying information and position information in association with a character region placed in a physical space;
   a character region detection unit constructed to detect a character region from first captured image data obtained by capturing an image of the physical space by an image sensing apparatus, using the character region specifying information stored in the storage unit;
   an image position information detection unit constructed to detect the image position information of an index corresponding to the detected character region; and
   an estimation unit constructed to estimate a position and orientation of the image sensing apparatus upon capturing the captured image data based on image position information of the detected character region in the first captured image data, and the position information which is stored in the storage unit and corresponds to the detected character region,
   wherein the character region detection unit comprises:
   a contour extraction unit constructed to extract contours in the captured image data;
   a setting unit constructed to set a character region candidate using the contours;
   a normalization processing unit constructed to normalize a size of the character region candidate; and
   a character recognition processing unit constructed to apply character recognition processing to the normalized character region candidate;
   a virtual object composition unit constructed to generate composite image data by combining a virtual object and captured image data obtained by capturing an image of a physical space by the image sensing apparatus, based on the captured image data and an orientation and position of the image sensing apparatus estimated based on the captured image data; and
   a display unit constructed to display the composite image data.

6. A position and orientation measuring method comprising:
- storing, in a storage unit, character region specifying information and position information in association with a character region placed in a physical space;
- detecting by a character region detection unit a character region fron first captured image data obtained by capturing an image of the physical space by an image sensing apparatus, using the character region specifying information stored in the storage unit;
- detecting by an image position information detection unit image position information of an index corresponding to the detected character region; and
- estimating by an estimation unit a position and orientation of the image sensing apparatus upon capturing the captured image data based on image position information of the detected character region in the first captured image data, and the position information which is stored in the storage unit and corresponds to the detected character region,
- wherein the character region detection unit comprises:
- a contour extraction unit constructed to extract contours in the captured image data;
- a setting unit constructed to set a character region candidate using the contours;
- a normalization processing unit constructed to normalize a size of the character region candidate; and
- a character recognition processing unit constructed to apply character recognition processing to the normalized character region candidate.

7. A non-transitory computer-readable storage medium on which is stored a computer program for causing a computer to execute a position and orientation measuring method, the program comprising:
- storing, in a storage unit, character region specifying information and position information in association with a character region placed in a physical space;
- detecting by a character region detection unit a character region from first captured image data obtained by capturing an image of the physical space by an image sensing apparatus, using the character region specifying information stored in the storage unit;
- detecting by an image position information detection unit image position information of an index corresponding to the detected character region; and
- estimating by an estimation unit a position and orientation of the image sensing apparatus upon capturing the captured image data based on image position information of the detected character region in the first captured image data, and the position information which is stored in the storage unit and corresponds to the detected character region,
- wherein the character region detection unit comprises:
- a contour extraction unit constructed to extract contours in the captured image data;
- a setting unit constructed to set a character region candidate using the contours;
- a normalization processing unit constructed to normalize a size of the character region candidate; and
- a character recognition processing unit constructed to apply character recognition processing to the normalized character region candidate.

* * * * *